(12) United States Patent
Kunigita et al.

(10) Patent No.: US 8,669,888 B2
(45) Date of Patent: Mar. 11, 2014

(54) HANGEUL INPUT KEYPAD AND METHOD USING THE SAME

(75) Inventors: Hisayuki Kunigita, Seoul (KR); Shi Hyong Cho, Seoul (KR); Yong Ho Lee, Seoul (KR); Young Ho Choi, Gyeonggi-do (KR)

(73) Assignees: Sony Computer Entertainment Korea Inc., Seoul (KR); Sony Computer Entertainment Inc., Tokyo (JP)

( * ) Notice: Subject to any disclaimer, the term of this patent is extended or adjusted under 35 U.S.C. 154(b) by 1228 days.

(21) Appl. No.: 11/632,679

(22) PCT Filed: Apr. 25, 2006

(86) PCT No.: PCT/KR2006/001554
§ 371 (c)(1),
(2), (4) Date: Apr. 17, 2007

(87) PCT Pub. No.: WO2006/115365
PCT Pub. Date: Nov. 2, 2006

(65) Prior Publication Data
US 2008/0042885 A1    Feb. 21, 2008

(30) Foreign Application Priority Data

Apr. 25, 2005  (KR) ........................ 10-2005-0034176
Oct. 12, 2005  (KR) ........................ 10-2005-0095928

(51) Int. Cl.
*H04B 1/40*  (2006.01)
*H03K 17/94*  (2006.01)
*H03M 11/00*  (2006.01)

(52) U.S. Cl.
USPC .................. 341/28; 341/20; 341/21; 400/83; 400/110

(58) Field of Classification Search
USPC ........................ 341/20, 22, 28; 400/83, 110
See application file for complete search history.

(56) References Cited

U.S. PATENT DOCUMENTS 4,187,031 A * 2/1980 Yeh .................................. 400/83
5,184,315 A   2/1993 Lapeyre
(Continued)

FOREIGN PATENT DOCUMENTS

GB    2 149 946    6/1985
JP    9-16301      1/1997
(Continued)

OTHER PUBLICATIONS

Notice of Rejection issued on May 10, 2011, from corresponding Japanese Application No. 2007-556981.
(Continued)

*Primary Examiner* — Hai Phan
*Assistant Examiner* — Amine Benlagsir
(74) *Attorney, Agent, or Firm* — Katten Muchin Rosenman LLP (57) ABSTRACT

The present invention relates to a Hangeul input keypad and a method using the same. Basic consonants and basic vowels are assigned to the Hangeul input keypad, the number of the basic consonant-assigned keys is less than that of the basic vowel-assigned keys, the consonant keys and the vowel keys are disposed separately, and a shift key converting the basic consonants to extended consonants is disposed adjacent to the consonant keys to which the basic consonants convertible to the extended consonants are assigned.

The Hangeul input keypad and method according to the present invention improves speed of Hangeul input, provides convenience in operation of consonant keys and a shift key, and ease of a user's learning of the Hangeul input method by optimizing the disposition of the consonants and vowels.

24 Claims, 7 Drawing Sheets

| 1<br>ㅗ ㅛ | 2<br>ㅡ | 3<br>ㅜ ㅠ |
|---|---|---|
| 4<br>ㅏ ㅑ | 5<br>ㅣ | 6<br>ㅓ ㅕ |
| 7<br>ㄱ ㄷ | 8<br>ㅇ ㅅ | 9<br>ㄴ ㄹ |
| *<br>Shift | 0<br>ㅂ ㅈ ㅁ | #<br>↵ |

(56) References Cited

U.S. PATENT DOCUMENTS

| | | | |
|---|---|---|---|
| 5,952,942 A * | 9/1999 | Balakrishnan et al. | 341/20 |
| 6,170,000 B1 | 1/2001 | Bories et al. | |
| 6,459,390 B1 * | 10/2002 | Kim | 341/20 |
| 6,462,678 B1 * | 10/2002 | Ahn | 341/28 |
| 6,760,477 B2 * | 7/2004 | Ko | 382/185 |
| 6,822,585 B1 * | 11/2004 | Ni et al. | 341/28 |
| 6,864,809 B2 * | 3/2005 | O'Dell et al. | 341/28 |
| 7,061,403 B2 * | 6/2006 | Fux | 341/28 |
| 7,671,765 B2 * | 3/2010 | Fux | 341/28 |
| 2003/0190181 A1 * | 10/2003 | Kim | 400/472 |
| 2004/0121817 A1 * | 6/2004 | Tng et al. | 455/566 |
| 2004/0239534 A1 * | 12/2004 | Kushler et al. | 341/28 |
| 2005/0144566 A1 * | 6/2005 | Zhang | 715/810 |

FOREIGN PATENT DOCUMENTS

| | | | |
|---|---|---|---|
| JP | 2001-84086 | | 3/2001 |
| JP | 2002-373046 | | 12/2002 |
| KR | 10-2002-0035698 A | | 5/2002 |
| KR | 10-2002-044105 A | | 6/2002 |
| KR | 2003057000 A | * | 7/2003 |
| KR | 2003-0083069 | | 10/2003 |

OTHER PUBLICATIONS

Notice of Rejection issued on Jun. 22, 2010, from corresponding Japanese Application No. 2007-556981.
Supplementary European Search Report dated Sep. 16, 2010, from corresponding European Application No. 06 75 7531.
Internet page: http://han.s56.xrea.com/blog.hanappli.net/archives/2005/04/post_26.html dated Apr. 5, 2005.
International Preliminary Report on Patentability and the Written Opinion of the International Searching Authority dated Oct. 30, 2007, from the corresponding International Application.
International Search Report from the corresponding PCT/KR2006/001554.
Office Action dated Oct. 30, 2006 for the corresponding Korean Patent Application 10-2005-0095928.

* cited by examiner

Fig. 1

| 1  | 2  | 3  |
|----|----|----|
| ㅣ | •  | ㅡ |
| 4  | 5  | 6  |
| ㄱ ㅋ | ㄴ ㄹ | ㄷ ㅌ |
| 7  | 8  | 9  |
| ㅂ ㅍ | ㅅ ㅎ | ㅈ ㅊ |
| ◀ * | 0 ㅇ ㅁ | # ▶ |

Fig. 2

| 1 ㄱ | 2 ㅡ | 3 ㅏ ㅓ |
|---|---|---|
| 4 ㄹ | 5 ㅁ | 6 ㅗ ㅜ |
| 7 ㅅ | 8 ㅇ | 9 ㅣ |
| * Stroke addition | 0 ㅡ | # Double consonant |

Fig. 3

| 1 ㅗ ㅛ | 2 ㅡ | 3 ㅜ ㅠ |
|---|---|---|
| 4 ㅏ ㅑ | 5 ㅣ | 6 ㅓ ㅕ |
| 7 ㄱ ㄷ | 8 ㅇ ㅅ | 9 ㄴ ㄹ |
| ★ Shift | 0 ㅂ ㅈ ㅁ | # ↵ |

Fig. 4

| 1 ㅗ ㅛ | 2 ㅡ | 3 ㅜ ㅠ |
|---|---|---|
| 4 ㅏ ㅑ | 5 ㅣ | 6 ㅓ ㅕ |
| 7 ㄱ ㄷ | 8 ㅇ ㅅ | 9 ㄴ ㄹ |
| ★ Shift | 0 ㅂ ㅈ | # ㅁ |

HANGEUL INPUT KEYPAD AND METHOD USING THE SAME

This application is a National Phase Application of International Application No. PCT/KR2006/001554, filed Apr. 25, 2006, which claims the benefit under 35 U.S.C. 119 (a-e) of Korean Application No. 10-2005-0034176 filed Apr. 25, 2005, and KR 10-2005-0095928 filed Oct. 12, 2005, which are herein incorporated by reference.

TECHNICAL FIELD

The present invention relates to a Hangeul (Korean Language) input keypad and a method using the same to improve input speed and convenience by disposing keys such that the number of consonant-assigned keys is less than the number of vowel-assigned keys, and by optimally disposing basic consonant-assigned keys and basic vowel-assigned keys in separated locations in the Hangeul input keypad for various digital devices.

In the environment of rapidly developing portable digital devices, research on more efficient Hangeul input methods for the devices is being carried out, and development of the Hangeul input methods is accordingly on an increasing trend.

BACKGROUND ART

Generally in portable digital devices such as a mobile phone or a PDA (Personal Digital Assistant) phone having a mobile phone function, a keypad device having a limited number of keys arranged by a specific method is used as a Hangeul input device. A conventional keypad is configured to have 10 keys to each of which a different number is assigned, and 2 extra function keys.

In the Hangeul input method using the keypad having a limited number of keys, in the case that a plurality of consonants or vowels are assigned to a key, a method of assigning consonant, vowel, or function keys for Hangeul to the keypad, or a method of selecting a plurality of consonants or vowels, plays an important role in Hangeul input speed, the number of key operations required for the input, and convenience of the input.

As a typical Hangeul input method using a keypad developed up to the present time, there exists an input method (shown in FIG. 1A) using a so-called "Cheonjiin" system in which "Cheon" ( • ), "Ji" (—) and "In" ( | ) respectively indicate heaven, earth, and human according to the principle of the Hangeul invention. The Hangeul input method according to the Cheonjiin system does not directly assign vowels of Hangeul to a keypad but assigns •, —, | each to a separate key. This Hangeul input method utilizes a keypad configuration for inputting vowels by using combinations of the 3 keys, wherein consonants are assigned to other keys.

As another typical Hangeul input method, there exists a method (shown in FIG. 1B) in which basic consonants are assigned to individual keys, basic vowels are assigned to other keys, and extended consonants or combined vowels are formed by using function keys such as an additional stroke key or double consonant key. Because there are more consonants than vowels in the basic phonemes of Hangeul and the vowels may easily be converted by using a function key such as an additional stroke key, a keypad used in such a Hangeul input method adopts a configuration in which the number of consonant-assigned keys is greater than the number of vowel-assigned keys.

Additionally, the conventional keypad has a configuration in which function keys such as an additional stroke key are disposed at a generally used location without considering the flow lines of a user's key operation with fingers on the keypad. For example, a key * and a key # are used as function keys in the case of a keypad having 12 keys.

DISCLOSURE

Technical Problem

However, the Hangeul input method using the Cheonjiin system has problems that the number of key operations required for inputting a combined vowel is increased, and that it is difficult for a user to understand the input method and to be familiar with the input method, because the real vowels of Hangeul are not available as keys in their real form and the user must combine •, — and | correctly after considering the structure of a vowel to be input.

Additionally, the Hangeul input method using a conventional keypad shown in FIG. 1B has problems that the required number of operations of function keys such as an additional stroke key in order to input a consonant or vowel inevitably increases, the user's operation cannot be performed rapidly and smoothly because the consonants or vowels frequently used together with the additional stroke key are not assigned to the corresponding keys located close to the additional stroke key, and the flow line of operation is lengthened especially when the keypad is operated with a single hand. As a result, there are disadvantages that the number of key operations required for input is increased, and speed and convenience of the input decreases.

Technical Solution

To solve the above problems, an object of the present invention is to provide a Hangeul input keypad and Hangeul input method using the keypad to improve speed of Hangeul input, convenience of the input, and ease of learning the input method, by inputting Hangeul with a keypad configured such that the number of basic vowel-assigned keys is greater than the number of basic consonant-assigned keys, a shift key converting basic consonants to extended consonants is located close to the basic consonant-assigned keys convertible to extended consonants, and the vowel-assigned keys and the consonant-assigned keys are disposed separately.

Advantageous Effect

The Hangeul input keypad and method according to the present invention are provided to improve speed of Hangeul input and convenience of keypad operation by using the Hangeul input keypad in which consonants and vowels are assigned in separate locations, and a shift key converting basic consonants to extended consonants is disposed adjacent to the keys assigned with basic consonants convertible to extended consonants.

The Hangeul input keypad according to the present invention is provided to easily perform a carriage return function by additionally installing a function key for carriage return.

The Hangeul input keypad according to the present invention has an effect that a user may easily become familiar with the locations of consonants and vowels and therefore learn the Hangeul input method easily, because the consonants and vowels are disposed in separate locations, the vowels are consistently assigned according to their morphological similarity and basic consonants convertible to extended consonants are assigned concentrated at adjacent locations.

The Hangeul input method according to the present invention has effects of improving convenience of key operations and speed of Hangeul input by enabling input of the extended consonants or combined vowels with repeated strokes of consonant keys or vowel keys without using the shift key, in the case of a user who is familiar with the Hangeul input method according to the present invention.

Additionally, the Hangeul input method according to the present invention has an effect of enabling even users who are not familiar with the disposition of Hangeul jamos (units that make up the Hangeul alphabet) on the keypad or the input of Hangeul using keypads to easily input Hangeul, by displaying Hangeul consonants and vowels which can be input by the corresponding consonant keys, vowel keys and shift keys on a separate input candidate group display window of a screen of a display device.

BEST MODE FOR CARRYING OUT THE INVENTION

In order to achieve the above object, a Hangeul input keypad according to the present invention comprises a plurality of consonant keys to which at least two basic consonants selected from the group consisting of ㄱ, ㄴ, ㄷ, ㄹ, ㅁ, ㅂ, ㅅ, ㅇ and ㅈ are assigned; a plurality of vowel keys to which at least one basic vowel from the group consisting of ㅏ, ㅑ, ㅓ, ㅕ, ㅗ, ㅛ, ㅜ, ㅠ, ㅡ and ㅣ is assigned; and a shift key converting the basic consonants to extended consonants selected from the group consisting of ㅋ, ㅌ, ㅍ, ㅎ, ㅊ, ㄲ, ㄸ, ㅃ, ㅆ and ㅉ, wherein the basic consonants convertible to the extended consonants by the shift key are assigned to the consonant keys located adjacent to the shift key, the consonant keys and the vowel keys are disposed on a keypad in a consonant key group and a vowel key group, and the number of the consonant keys is less than that of the vowel keys.

Preferably, the Hangeul input keypad according to the present invention further includes a function key of carriage return, 4 or 5 consonant keys and 6 vowel keys. In the case of 4 consonant keys, each of the groups (ㄱ, ㄷ), (ㅇ, ㅅ), (ㅂ, ㅈ, ㅁ), and (ㄴ, ㄹ) is assigned to a different one of the 4 consonant keys. In the case of 5 consonant keys, each of the groups (ㄱ, ㄷ), (ㅇ, ㅅ), (ㅂ, ㅈ), (ㄴ, ㄹ), and (ㅁ) is assigned to a different one of the 5 consonant keys. In the case of 6 vowel keys, each of the groups (ㅗ, ㅛ), (ㅏ, ㅑ), (ㅡ), (ㅣ), (ㅜ, ㅠ), and (ㅓ, ㅕ) is assigned to a different one of the 6 vowel keys.

The shift key according to the present invention is preferably disposed at a position adjacent to the consonant key to which ㄱ and ㄷ are assigned, the consonant key to which ㅇ and ㅅ are assigned, and the consonant key to which ㅂ, ㅈ and ㅁ are assigned, or at a position adjacent to the consonant key to which ㄱ and ㄷ are assigned, the consonant key to which ㅇ and ㅅ are assigned, and the consonant key to which ㅂ and ㅈ are assigned. In this way, convenience in input operation of the extended consonants is enhanced by disposing keys to be operated together close to each other.

The Hangeul input keypad according to the present invention may be provided in a directly operated form such as a keypad of a mobile phone, or alternatively in a form of display on screens of various display devices and used together with an additional operation device.

In a first example embodiment of the Hangeul input method according to the present invention, input of a basic consonant is performed by selecting a consonant key to which the basic consonant to be input is assigned, and selecting the basic consonant to be input by operating the selected consonant key; input of an extended consonant is performed by selecting a consonant key to which the basic consonant corresponding to the extended consonant to be input is assigned, selecting the corresponding basic consonant by operating the selected consonant key, and operating a shift key; input of a basic vowel is performed by selecting a vowel key to which the basic vowel to be input is assigned, and selecting the basic vowel to be input by operating the selected vowel key; and input of a combined vowel formed by combining more than two basic vowels is performed by selecting and operating vowel keys, in the writing sequence of the combined vowel in Hangeul, to which the basic vowels forming the combined vowels are assigned.

The basic consonants assigned to the selected consonant key are sequentially and circularly selected by repeatedly operating the selected consonant key, the basic vowels assigned to the selected vowel key are sequentially and circularly selected by repeatedly operating the selected vowel key, and the extended consonants to be converted from the corresponding basic consonants are sequentially and circularly selected by repeatedly operating the shift key.

Particularly, the extended consonants are circularly selected in the sequence of the aspirate of the corresponding basic consonant and the fortis of the corresponding basic consonant by repeatedly operating the shift key, or in the sequence of the aspirate of the corresponding basic consonant, the fortis of the corresponding basic consonant and the corresponding basic consonant by repeatedly operating the shift key.

In a first modified example embodiment of the Hangeul input method according to the present invention, the selected basic consonant, extended consonant, basic vowel and combined vowel are displayed on a display screen. The display screen includes an input window for displaying the selected basic consonant, extended consonant, basic vowel, and combined vowel; and an input candidate group display window for sequentially displaying the basic consonants and basic vowels assigned respectively to the consonant keys and vowel keys when selecting the consonant keys and vowel keys, and displaying the extended consonants converted from the corresponding basic consonants by the shift key in the sequence of an aspirate of the corresponding basic consonants and fortis of the corresponding basic consonants when selecting the shift key.

In a second example embodiment of the Hangeul input method according to the present invention, input of a basic consonant is performed by selecting a consonant key to which the basic consonant to be input is assigned, and selecting the basic consonant to be input by operating the selected consonant key; input of an extended consonant is performed by selecting a consonant key to which the basic consonant corresponding to the extended consonant to be input is assigned, and selecting the extended consonant to be input by repeatedly operating the selected consonant key; input of a basic vowel is performed by selecting a vowel key to which the basic vowel to be input is assigned, and selecting the basic vowel to be input by operating the selected vowel key; and input of a combined vowel formed by combining more than two basic vowels is performed by selecting a vowel key to which a first basic vowel (the preceding basic vowel of basic vowels forming a combined vowel in the writing sequence of the combined vowel in Hangeul) to be input is assigned, and selecting the combined vowel to be input by repeatedly operating the selected vowel key.

In the second example embodiment of the Hangeul input method according to the present invention, input of ㅢ among the combined vowels is preferably performed by selecting a vowel key to which ㅣ is assigned, and selecting the ㅢ by repeatedly operating the vowel key to which ㅣ is assigned.

In the second example embodiment of the Hangeul input method according to the present invention, when selecting a consonant key among a plurality of consonant keys in input of the basic consonants and the extended consonants, the basic consonants assigned to the selected consonant key and the extended consonants converted from the basic consonants assigned to the selected consonant key are sequentially and circularly selected by repeatedly operating the selected consonant key; and when selecting a vowel key among a plurality of vowel keys in the input of the basic vowels and the combined vowels, the basic vowels assigned to the selected vowel key and the combined vowels having the basic vowels assigned to the selected vowel key as the first basic vowel are sequentially and circularly selected by repeatedly operating the selected vowel key.

In the input of the basic consonants and extended consonants, circular selection according to the repeated selection of a consonant key is preferably performed in the sequence of the basic consonants, aspirates of the basic consonants, and fortises of the basic consonants assigned to the selected consonant key.

In a second modified example embodiment of the Hangeul input method according to the present invention, when selecting a consonant key among a plurality of consonant keys in the input of the basic consonants and the extended consonants, the basic consonants assigned to the selected consonant key and the extended consonants corresponding to the assigned basic consonants are displayed on an input candidate group display window of a display screen in the sequence of the assigned basic consonants and the extended consonants corresponding to the assigned basic consonants, and the assigned basic consonants and extended consonants corresponding to the assigned basic consonants displayed on the input candidate group display window are sequentially and circularly selected and displayed on an input window of the display screen by repeatedly operating the selected consonant key; and when selecting a vowel key among a plurality of vowel keys in the input of the basic vowels and the combined vowels, the basic vowels assigned to the selected vowel key and the combined vowels having the assigned basic vowels as the first basic vowel are displayed on the input candidate group display window of the display screen in the sequence of the assigned basic vowels and the combined vowels having the assigned basic vowels as the first basic vowel, and the assigned basic vowels and the combined vowels having the assigned basic vowels as the first basic vowel displayed on the input candidate group display window are sequentially and circularly selected and displayed on the input window of the display screen by repeatedly operating the selected vowel key.

When selecting a vowel key to which the ㅣ is assigned, the ㅣ and ㅢ are sequentially displayed on the input candidate group display window of the display screen, and the ㅣ and ㅢ are sequentially and circularly selected by repeatedly operating the selected vowel key to which the ㅣ is assigned.

Additionally, in a third example embodiment of the Hangeul input method according to the present invention, input of the basic consonant and basic vowel may be performed in the same manner as that of the first example embodiment, and input of the extended consonant and combined vowel may be performed in the same manner as that of the first example embodiment or the second example embodiment of the present invention.

As described above, the Hangeul input keypad and the Hangeul input methods using the same according to the present invention provide more convenient input of vowels, when compared to a conventional method, by reducing the number of consonant keys and increasing the number of vowel keys, and also provide improved speed and greater convenience of Hangeul input, because consonants may be rapidly converted by using a shift key disposed close to the consonant keys.

MODE FOR CARRYING OUT THE INVENTION

Hereinafter, example embodiments of the present invention are described in detail with reference to the accompanying drawings.

Example Embodiment of Hangeul Input Keypad

Figure 2:
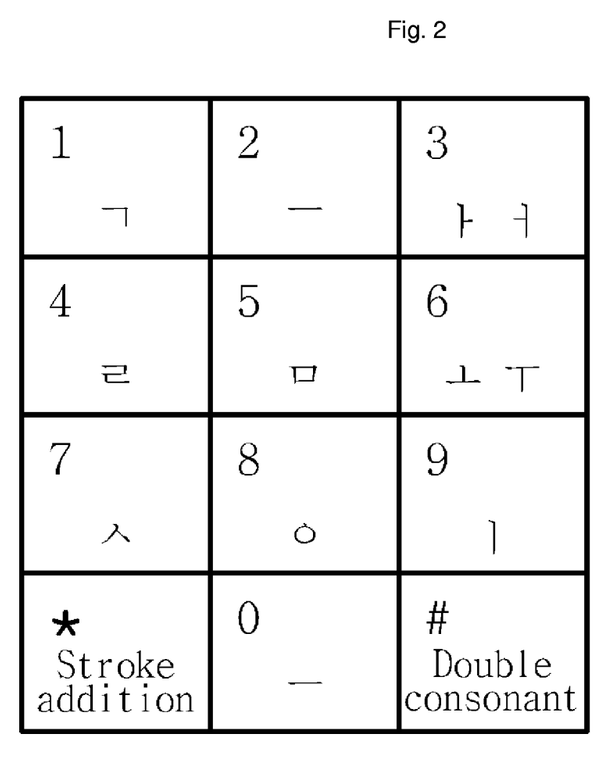
FIGS. 2A and 2B show configurations of Hangeul input keypads according to example embodiments of the present invention.

FIGS. 2A and 2B show a Hangeul input keypad according to an example embodiment of the present invention. As shown in FIGS. 2A and 2B, The Hangeul input keypad according to the present invention utilizes a generally used keypad of 3×4 form, in which basic vowels ㅗ, ㅛ, ㅡ, ㅜ, ㅠ, ㅏ, ㅑ, ㅣ, ㅓ and ㅕ are assigned to the upper 6 keys to which numbers 1 to 6 are assigned. However, in the example embodiment of the present invention, each of the vowel groups (ㅗ, ㅛ), (ㅡ), (ㅜ, ㅠ), (ㅏ, ㅑ), (ㅣ), and (ㅓ, ㅕ) is assigned sequentially to a different one of the 6 keys.

Basically, the groups (ㅗ, ㅛ), (ㅡ), and (ㅜ, ㅠ) classified into the ㅡ series in the form of the vowels are respectively assigned to the number keys 1, 2, and 3, and the groups (ㅏ, ㅑ), (ㅣ), and (ㅓ, ㅕ) classified into the ㅣ series are respectively assigned to the number keys 4, 5, and 6. Particularly, two basic vowels of the same family such as (ㅗ, ㅛ), (ㅜ, ㅠ), (ㅏ, ㅑ), and (ㅓ, ㅕ) are assigned to different individual keys, and ㅡ and ㅣ are individually assigned to different keys.

Consistent assignment of the basic vowels according to the form of vowels is helpful for a user to be familiar with locations of vowels in a keypad.

Basic consonants ㄱ, ㄴ, ㄷ, ㄹ, ㅁ, ㅂ, ㅅ, ㅇ and ㅈ are assigned to 4 or 5 keys. As shown FIG. 2A, (ㄱ, ㄷ), (ㅇ, ㅅ), (ㄴ, ㄹ), and (ㅂ, ㅈ, ㅁ) are respectively assigned to the number keys 7, 8, 9, and 0. Alternatively, as shown in FIG. 2B, (ㄱ, ㄷ), (ㅇ, ㅅ), (ㄴ, ㄹ), (ㅂ, ㅈ), and (ㅁ) are respectively assigned to the number keys 7, 8, 9, 0, and the key #.

In addition to the basic consonants, there exists extended consonants derived from the basic consonants, and ㅋ, ㅌ, ㅍ, ㅊ, ㅎ, ㄲ, ㄸ, ㅃ, ㅆ and ㅉ are classified as the extended consonants in the description of the present invention.

As shown in FIGS. 2A and 2B, the Hangeul input keypad according to the present invention has 4 or 5 consonant keys to which only the basic consonants are assigned, and the extended consonants are not directly assigned to the keys. The extended consonants are input by converting the basic consonants with a shift key.

The relationship between the basic consonants and the extended consonants is shown in Table 1. In Table 1, the extended consonants are divided into groups of aspirate and fortis for convenience.

TABLE 1

| Basic Consonants (9) | Extended Consonants (10) | |
| --- | --- | --- |
| | Aspirate (5) | Fortis (5) |
| ㄱ | ㅋ | ㄲ |
| ㄴ | | |
| ㄷ | ㅌ | ㄸ |
| ㄹ | | |
| ㅁ | | |
| ㅂ | ㅍ | ㅃ |
| ㅅ | | ㅆ |
| ㅇ | | |
| ㅈ | ㅊ | ㅉ |
| | ㅎ | |

Figure 1:
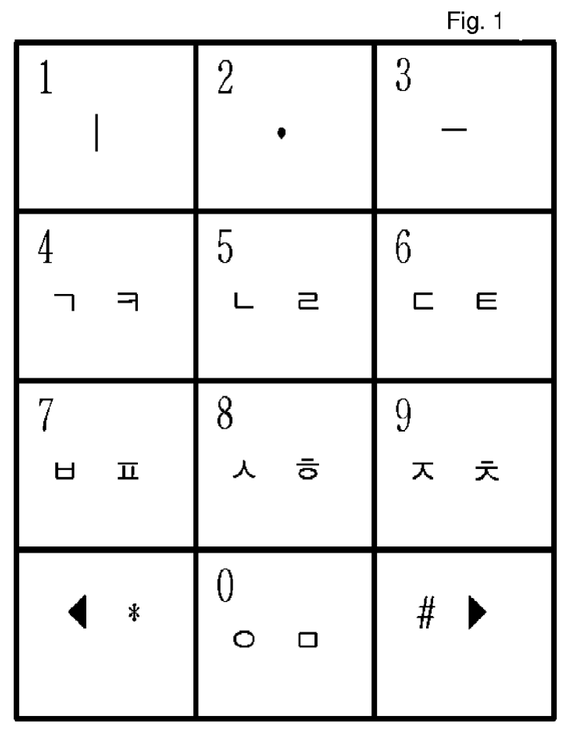
FIGS. 1A and 1B show configurations of conventional Hangeul input keypads.

A shift key is disposed close to keys to which the basic consonants ㄱ, ㄷ, ㅇ, ㅅ, ㅂ and ㅈ convertible to the extended consonants as shown in FIG. 1 are assigned. As shown in FIG. 2A, the shift key is disposed at a position adjacent to the consonant keys to which (ㄱ, ㄷ), (ㅇ, ㅅ), and (ㅂ, ㅈ, , ㅁ) are assigned. Alternatively, as shown in FIG. 2B, the shift key is disposed at a position adjacent to the consonant keys to which (ㄱ, ㄷ), (ㅇ, ㅅ), and (ㅂ, ㅈ) are assigned.

As described above, by disposing the shift key and keys to which the basic consonants convertible to the extended consonants by using the shift key are assigned close to each other, the length of a flow line in operation of the shift key is reduced, and the extended consonants may be easily converted and input with a single hand.

As shown in FIG. 2A, the Hangeul input keypad according to an example embodiment of the present invention further includes a function key of carriage return in a line feed in a Hangeul input step.

A conventional Hangeul input keypad is inconvenient in key operation, because cursor movement keys have to be operated several times to move to a new line.

The Hangeul input keypad according to the present invention provides a Hangeul input environment of easy carriage return by installing a function key that can move to a new line by one step operation.

The function key of the carriage return acts like an enter key of a computer keyboard. As shown in FIG. 2A, a symbol corresponding to the enter key of a keyboard is assigned to a key #.

As described above, the Hangeul input keypad according to the present invention has a configuration in which basic vowel-assigned keys and basic consonant-assigned keys are disposed in separate groups on a keypad. That is, the Hangeul input keypad according to the present invention has a configuration in which a vowel key group and a consonant key group are distinctly distinguished on the keyboard by assigning the basic vowels to the number keys 1 to 6 and the basic consonants to the number keys 7, 8, 9, 0, and optionally to a key #.

The Hangeul input keypad according to the present invention is not limited to the configurations shown in FIGS. 2A and 2B, and variations or modifications can be made by disposing the basic vowel-assigned keys and the basic consonant-assigned keys in separate locations, and disposing the shift key converting the basic consonants to the extended consonants close to the keys assigned with basic consonants convertible to the extended consonants.

The Hangeul input keypad according to the present invention may be provided in a form of a keypad such as a keypad of a mobile phone, or in a form of display on a screen of a display device.

In the case of a portable digital device other than the mobile phone, Hangeul may be input, while displaying a form of the Hangeul input keypad shown in FIGS. 2A and 2B on a screen of a display device of the portable digital device, and a user may input Hangeul by using various input devices of the portable digital device through the operation functioning in the same manner as pressing keypads of the mobile phone.

Hangeul input methods utilizing the Hangeul input keypad according to the present invention are described hereinafter.

First Example Embodiment of Hangeul Input Method

In a first example embodiment of the Hangeul input method according to the present invention, a method of inputting a basic consonant is performed by firstly selecting a consonant key assigned with basic consonants to be input on the keypad. If the selected consonant key is operated once, the first consonant among the basic consonants assigned to the consonant key is selected and input. If the selected consonant key is operated again, the next consonant is selected and input.

In the case that three basic consonants are assigned to the consonant key, the first consonant is selected by the first operation of the consonant key, and the following consonants are sequentially selected by the second operation and the third operation.

In the case of operating the same consonant key repeatedly, operation of selecting consonants sequentially is performed circularly according to the number of operations. For example, input of the consonants is performed by selecting ㄱ by operating once the number key 7 of the keypad shown in FIGS. 2A and 2B, selecting ㄷ by operating 2 times, and selecting ㄱ again by operating 3 times.

An input method of basic vowels is omitted, because it is performed in the same manner as the input method of the basic consonants.

In an input method of extended consonants, if a basic consonant corresponding to the extended consonant to be input is selected by selecting and operating a consonant key assigned with the basic consonant, the selected basic consonant is displayed on a screen, and then the extended consonant to be input is selected and input by operating a shift key.

To describe in more detail, if, for example, the number key 7 of the keypad shown in FIGS. 2A and 2B is operated once, ㄱ is selected. If the shift key is operated once in the state that ㄱ is selected, ㄱ is converted to ㅋ, and subsequently if the shift key is operated once more, ㅋ is converted to ㄲ. These steps are repeated circularly according to operation of the shift key. As shown in Table 1, in the case of basic consonants of ㄱ, ㄷ, ㅂ and ㅈ convertible to extended consonants of both aspirates and fortises, the basic consonant is firstly converted to an aspirate by operating the shift key once, and subsequently converted to a fortis by operating the shift key once more. This step is repeated circularly. In the case of a basic consonant convertible to only one of an aspirate or fortis, the converted aspirate or fortis is input even if the shift key is operated several times. The sequence of the conversion is not limited to 'from aspirate to fortis' and may also be 'from fortis to aspirate'.

In the Hangeul input method according to an example embodiment of the present invention, a conversion procedure of the consonants according to repeated operation of the shift key may circularly be performed between the aspirate and fortis of the extended consonant as described above, and may additionally be performed circularly including the corresponding basic consonant.

For example, if the number key 7 shown in FIGS. 2A and 2B is operated once, ㄱ is selected. If the shift key is operated once in the state that the ㄱ is selected, the ㄱ is converted to ㅋ. Subsequently if the shift key is operated once more, the ㅋ is converted to ㄲ. If the shift key is operated once more, the ㄲ is converted back to the ㄱ. These steps are circularly repeated as described above.

Because the conversion procedure of the consonants according to operation of the shift key is performed circularly including the corresponding basic consonant, an input extended consonant may be converted to a basic consonant simply with operation of the shift key without both deleting the input extended consonant and selecting the corresponding basic consonant again, even in the case that a user has incorrectly operated the shift key by mistake during Hangeul input. Therefore, convenience of Hangeul input operation is improved.

An input procedure of a combined vowel formed by combining more than one basic vowel is performed by selecting the basic vowels in the writing sequence of Hangeul, combining the selected basic vowels and inputting the combined vowel formed by combination of the selected basic vowels.

For example, the number key 6 is operated twice (ㅕ is selected thereby) and then the number key 5(ㅣ) is operated once to input ㅖ. Similarly, to input ㅘ, the number key 1 is operated once to input ㅗ and the number key 4 is operated once to input ㅏ. Additionally, if the number key 1 (ㅗ) is operated once, the number key 4(ㅏ) is operated once, and the number key 5 (ㅣ) is operated once, then finally the ㅙ is input.

Figure 3:
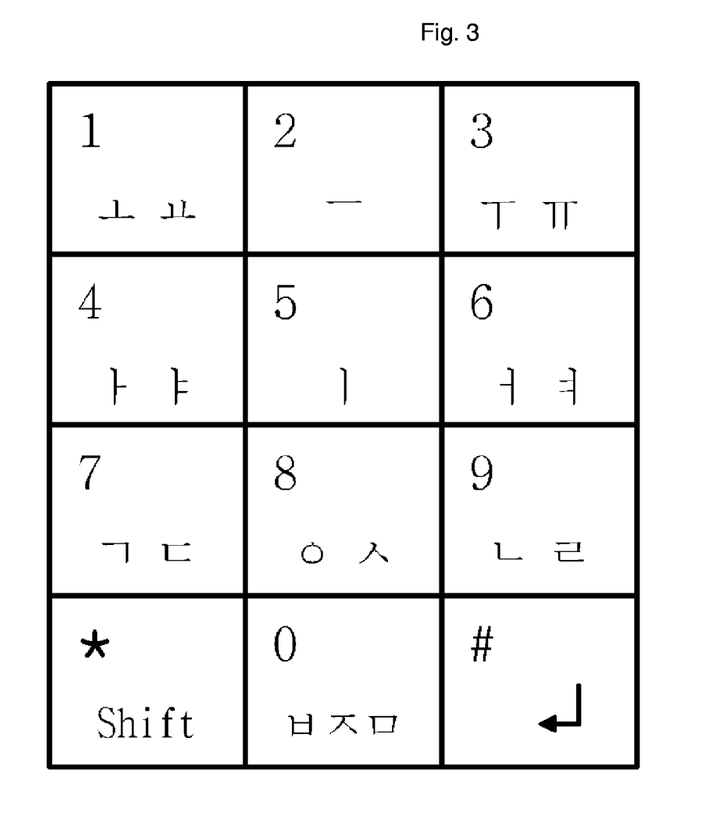
FIG. 3 is a schematic flow chart showing steps of Hangeul input and output using a Hangeul input keypad according to the present invention.

FIG. 3 is a schematic flow chart showing steps of Hangeul input and output using a Hangeul input keypad according to the present invention. As shown in FIG. 3, firstly a specified key input is performed by operation of a keypad 30 for Hangeul input. From a key input device processing table shown in Table 2 described below, a key input device 31 searches a basic phoneme (that is a basic consonant or basic vowel) corresponding to an initial key input value formed by operation of a number key of a keypad, or a converted phoneme (that is an extended consonant or consonant vowel) corresponding to a key input value formed by adding a shift key value or additionally input key input value to the initial key input value.

A Unicode conversion device 32 converts the input phoneme searched by the key input device 31 to a corresponding Unicode, compares with a previously input Unicode value stored in a Unicode buffer 33 and determines whether the input phoneme corresponds to choseong (initial consonant), jungseong (medial vowel) or jongseong (final consonant) of Hangeul. The Unicode values corresponding to choseong, jungseong and jongseong are described in Table 2. A letter cord conversion device 34 receives the Unicode value of choseong, jungseong and jongseong, converts the Unicode value to a letter code value and outputs the letter code value on a display device 35. A completed letter is displayed on the display device 35. Generally, the display device 35 has a font image table (not shown) corresponding to the letter code value output from the letter code conversion device 34, searches a font image corresponding to the letter code value from the font image table and displays the font image on the screen.

TABLE 2

| Basic Phoneme | | Unicode | + Additional Input 1 | Converted Phoneme | Unicode | + Additional Input 2 | Converted Phoneme | Unicode |
|---|---|---|---|---|---|---|---|---|
| Choseong | ㄱ (7) | 0x1100 | *(convert) | ㅋ | 0x100F | *(convert) | ㄲ | 0x1101 |
| | ㄴ (9) | 0x1102 | | | | | | |
| | ㄷ (77) | 0x1103 | *(convert) | ㅌ | 0x1110 | *(convert) | ㄸ | 0x1104 |
| | ㄹ (99) | 0x1105 | | | | | | |
| | ㅁ (000) | 0x1106 | | | | | | |
| | ㅂ (0) | 0x1107 | *(convert) | ㅍ | 0x1111 | *(convert) | ㅃ | 0x1108 |
| | ㅅ (88) | 0x1109 | *(convert) | ㅆ | 0x110A | | | |
| | ㅇ (8) | 0x110B | *(convert) | ㆆ | 0x1112 | | | |
| | ㅈ (00) | 0x110C | *(convert) | ㅊ | 0x110E | *(convert) | ㅉ | 0x110D |
| Jungseong | ㅏ (4) | 0x1161 | ㅣ (5) | ㅐ | 0x1162 | | | |
| | ㅑ (44) | 0x1163 | ㅣ (5) | ㅒ | 0x1164 | | | |
| | ㅓ (6) | 0x1165 | ㅣ (5) | ㅔ | 0x1166 | | | |
| | ㅕ (66) | 0x1167 | ㅣ (5) | ㅖ | 0x1168 | | | |
| | ㅗ (1) | 0x1169 | ㅣ (5) | ㅚ | 0x116C | | | |
| | | | ㅏ (4) | ㅘ | 0x116A | ㅣ (5) | ㅙ | 0x116B |
| | ㅛ (11) | 0x116D | | | | | | |
| | ㅜ (3) | 0x116E | ㅣ (5) | ㅟ | 0x1171 | | | |
| | | | ㅓ (6) | ㅝ | 0x116F | ㅣ (5) | ㅞ | 0x1170 |
| | ㅠ (33) | 0x1172 | | | | | | |
| | ㅡ (2) | 0x1173 | ㅣ (5) | ㅢ | 0x1174 | | | |
| | ㅣ (5) | 0x1175 | | | | | | |
| Jongseong | ㄱ (7) | 0x11A8 | *(convert) | ㅋ | 0x11BF | *(convert) | ㄲ | 0x11A9 |
| | | | ㅅ (88) | ㄳ | 0x11AA | | | |
| | ㄴ (9) | 0x11AB | ㅈ (00) | ㄵ | 0x11AC | | | |
| | | | ㅎ (8*) | ㄶ | 0x11AD | | | |
| | ㄷ (77) | 0x11AE | *(convert) | ㅌ | 0x11C0 | | | |
| | ㄹ (99) | 0x11AF | ㄱ (7) | ㄺ | 0x11B0 | | | |
| | | | ㅁ (000) | ㄻ | 0x11B1 | | | |
| | | | ㅂ (0) | ㄼ | 0x11B2 | | | |
| | | | ㅅ (88) | ㄽ | 0x11B3 | | | |
| | | | ㅌ (77*) | ㄾ | 0x11B4 | | | |
| | | | ㅍ (0*) | ㄿ | 0x11B5 | | | |
| | | | ㅎ (8*) | ㅀ | 0x11B6 | | | |

TABLE 2-continued

| Basic Phoneme | Unicode | + Additional Input 1 | Converted Phoneme | Unicode | + Additional Input 2 | Converted Phoneme | Unicode |
|---|---|---|---|---|---|---|---|
| ㅁ (000) | 0x11B7 | | | | | | |
| ㅂ (0) | 0x22B8 | *(convert) | ㅍ | 0x11C1 | | | |
| | | ㅅ(88) | ㅄ | 0x11B9 | | | |
| ㅅ (88) | 0x11BA | *(convert) | ㅆ | 0x11BB | | | |
| ㅇ (8) | 0x11BC | *(convert) | ㅎ | 0x11C2 | | | |
| ㅈ (00) | 0x11BD | *(convert) | ㅊ | 0x11BE | | | |

First Modified Example Embodiment of Hangeul Input Method

In a Hangeul input method according to the first example embodiment of the present invention as described above, Hangeul jamos selected in a keypad are generally displayed on a screen of a display device, however in a Hangeul input method according to the first modified example embodiment of the present invention described below, the configuration of the screen of the display device is different to that of the first example embodiment.

Figure 4:
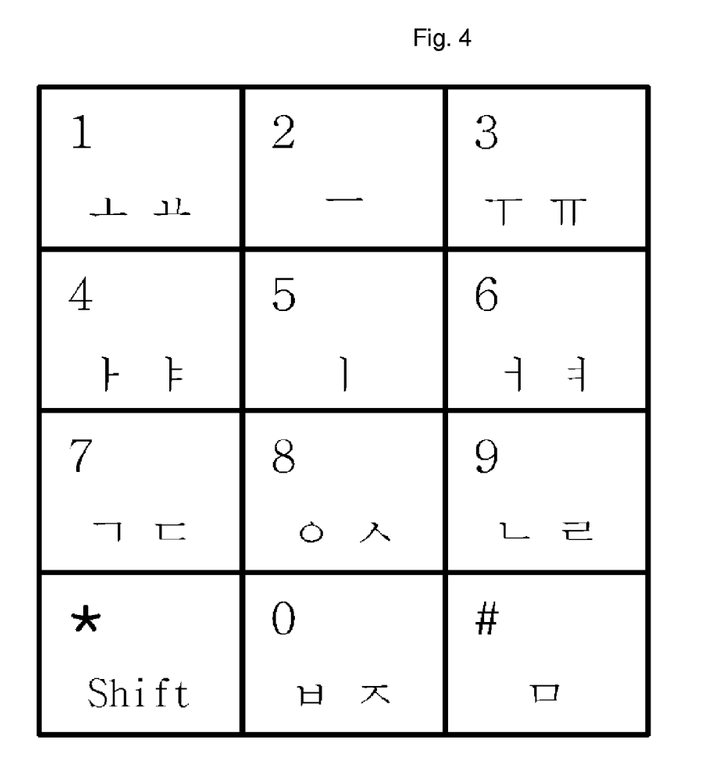
FIGS. 4A to 4C show the contents of a screen display of a display device in the first modified example embodiment of the present invention.

FIGS. 4A and 4B show screens of a display device used in the Hangeul input method according to the first modified example embodiment of the present invention. As shown in FIGS. 4A and 4B, the screen of the display device for displaying the input Hangeul comprises an input window 1 on which a basic consonant assigned to a consonant key, a basic vowel assigned to a vowel key, an extended consonant converted using a shift key or a combined vowel combined by basic vowels is displayed, and an input candidate group display window 2 disposed below (in FIG. 4A) or above (in FIG. 4B) the input window 1.

If any one of the consonant keys of the Hangeul input keypad according to the present invention is operated, the basic consonants assigned to the operated consonant key are displayed on the input candidate group display window 2, and if any one of the vowel keys is operated, the basic vowels assigned to the operated vowel key are displayed. For example, if the number key 0 of the keypad shown in FIG. 2A is operated, ㅂ, as the first assigned among the basic consonants assigned to the number key 0, is displayed on the input window 1, and all the basic consonants ㅂ, ㅈ and ㅁ assigned to the number key 0 are displayed on the input candidate group display window 2 in FIG. 4A.

On the input candidate group display window 2, a selection indicator 3, for example a cursor or rectangular flickering indicator, is displayed at a location of the basic consonant currently displayed on the input window 1. Such a selection indicator 3 is sequentially moved to the basic consonants displayed on the input candidate group display window 2 by repeatedly operating the corresponding consonant key. With the movement of the selection indicator 3, the basic consonant displayed on the input window 1 is converted to the basic consonant at which the selection indicator 3 is located.

Additionally, in a state that a specific basic consonant is displayed on the display window 1 by operating a consonant key, if a shift key is operated, extended consonants converted from the basic consonant already displayed on the input window 1 are displayed on the input candidate group display window 2, and at the same time, the first extended consonant among the extended consonants is displayed on the input window 1. That is, in a state that the number key 0 is selected, if a shift key is operated, ㅍ and ㅃ are displayed on the input candidate group display window 2, a selection indicator 3 is placed under ㅍ, and at the same time ㅍ is displayed on the input window 1. (Refer to FIG. 4B)

Alternatively, extended consonants and a basic consonant corresponding to the extended consonants are displayed on the input candidate group display window 2, in the sequence of the basic consonant, an aspirate and fortis of the basic consonant. Initially the selection indicator 3 is placed under the aspirate of the basic consonant. That is, in a state that the number key 0 is selected, if the shift key is operated, ㅂ, ㅍ and ㅃ are displayed on the input candidate group display window 2, and the selection indicator 3 is placed under ㅍ. (Refer to FIG. 4C)

As described above, in the Hangeul input method according to the first example embodiment of the present invention, Hangeul may be input by directly confirming on the input candidate group display window 2 a selection procedure of a basic consonant, basic vowel or combined vowel according to a user's selection of a consonant key or vowel key or a conversion procedure to an extended consonant according to the selection of a shift key. Therefore, a user who is not familiar with arrangement of Hangeul jamo in the keypad, such as a user who is not familiar with a Hangeul input method using the keypad (for example elder users), or a beginner who uses the Hangeul input keypad according to the present invention, may input Hangeul without any difficulty.

Table 3 shows display states on the input candidate group display window 2 according to selection of a consonant key, vowel key or shift key, when Hangeul is input by the Hangeul input method according to the first modified example using the Hangeul input keypad shown in FIG. 2A. When a basic consonant is selected together with a shift key as shown in Table 3, the basic consonant in a parenthesis may be displayed or not displayed on the input candidate group display window 2.

TABLE 3

| Hangeul jamo assigned to the selected keys | Display states on input candidate group display window |
|---|---|
| ㄱㄷ | ㄱㄷ |
| ㅇㅅ | ㅇㅅ |
| ㄴㄹ | ㄴㄹ |
| ㄱ + shift key | (ㄱ)ㅋㄲ |
| ㄷ + shift key | (ㄷ)ㅌㄸ |
| ㅇ + shift key | ㅇㅎ |
| ㅅ + shift key | (ㅅ)ㅆ |
| ㅂ + shift key | (ㅂ)ㅍㅃ |
| ㅈ + shift key | (ㅈ)ㅊㅉ |
| ㅂㅈㅁ | ㅂㅈㅁ |
| ㅑ | ㅑ |
| ㅕ | ㅕ |
| ㅗㅛ | ㅗㅛ |
| ㅜㅠ | ㅜㅠ |
| ㅡ | ㅡ |
| ㅣ | ㅣ |

Second Example Embodiment of Hangeul Input Method

Hereinafter, the second example embodiment of Hangeul input method using the Hangeul input keypad according to the present invention is described. In the same manner as with the first example embodiment, the Hangeul input method according to the second example embodiment uses the Hangeul input keypad according to the present invention as shown in FIGS. 2A and 2B, and the procedure of Hangeul input and output according to the second example embodiment is the same as that according to the first example embodiment, therefore the descriptions of the method and procedure are omitted.

Firstly, the basic consonant input method according to the second example embodiment is the same as that according to the first example embodiment in that a consonant key to which a basic consonant to be input is assigned is selected, and the basic consonant assigned to the consonant key is input by repeatedly operating the selected consonant key.

However, an extended consonant input method according to the second example embodiment is different from that according to the first example embodiment. That is, in the first example embodiment, a consonant key to which a basic consonant is assigned is selected, the basic consonant to be input is selected among basic consonants assigned to the consonant key, and a shift key is operated to convert the basic consonant to an extended consonant; and in the second example embodiment, a consonant key to which a basic consonant corresponding to an extended consonant to be input is assigned is selected, and the extended consonant is input by repeatedly operating the consonant key.

For example, if the number key 7 of the Hangeul input keypad shown in FIG. 2A is operated once, ㄱ is selected; if operated twice, ㄷ is selected; if operated three times, ㅋ, which is an aspirate of ㄱ, is selected; if operated four times, ㅌ, which is an aspirate of ㄷ, is selected; if operated five times, ㄲ, which is a fortis of ㄱ, is selected; if operated six times, ㄸ, which is a fortis of ㄷ, is selected; if operated repeatedly, a basic consonant, an aspirate of the basic consonant, and a fortis of the basic consonant are selected sequentially and circularly.

As described above, in the second example embodiment, an extended consonant may be input by repeatedly operating a consonant key to which a basic consonant corresponding to the extended consonant to be input is assigned, without using a shift key. That is, when ㅍ is input using the Hangeul input keypad shown in FIG. 2A, in the first example embodiment, the number key 0 is operated once, and a shift key is operated once to input the ㅍ; and in the second example embodiment, the number key 0 is operated four times to input the ㅍ.

Selection procedures of basic consonants and extended consonants by repeatedly operating the consonant keys are shown as follows (Based on the Hangeul input keypad shown in FIG. 2A).

Number key 7: ㄱ→ㄷ→ㅋ→ㅌ→ㄲ→ㄸ→ㄱ (repeated circularly)

Number key 8: ㅇ→ㅅ→ㅎ→ㅆ→ㅇ (repeated circularly)

Number key 9: ㄴ→ㄹ→ㄴ (repeated circularly)

Number key 0: ㅂ→ㅈ→ㅁ→ㅍ→ㅊ→ㅃ→ㅉ→ㅂ (repeated circularly)

As in the first example embodiment, the sequence of an aspirate and fortis may be changed to the sequence of the fortis and aspirate in the second example embodiment.

In the basic vowel input method according to the second example embodiment, a vowel key to which a basic vowel to be input is assigned is selected, and the basic vowel to be input is selected among the assigned basic vowels by repeatedly operating the selected vowel key. The basic vowel input method according to the second example embodiment is carried out in the same manner as the first example embodiment.

A combined vowel input method according to the second embodiment is different from that according to the first embodiment. In the first embodiment, a combined vowel is input by operating a vowel key to which a basic vowel constituting the combined vowel is assigned and selecting the combined vowel in the writing sequence. In the second embodiment, a combined vowel is input by selecting a vowel key to which a basic vowel preceding in the writing sequence among combined vowels to be input is assigned, and by repeatedly operating the selected vowel key.

For example, if the number key 6 of the Hangeul input keypad shown in FIG. 2A is operated once, ㅓ is selected; if operated twice, ㅕ is selected; if operated three times, ㅖ is selected; and if operated four times, ㅖ is selected. That is, the combined vowel of ㅖ, which is made by combining the ㅓ and ㅣ in the writing sequence of Hangeul, is selected by repeatedly operating three times a vowel key to which the ㅓ preceding in the writing sequence between the ㅓ and ㅣ is assigned.

In principle, ㅢ is input by twice operating the number key 2 to which ㅡ is assigned because the ㅡ precedes in the writing sequence of the ㅢ, however, the ㅢ may be selected by operating twice the number key 5 to which the ㅣ is assigned.

Selection sequences of basic vowels and combined vowels according to repeated selection of such vowel keys are shown as follows.

Number key 1: ㅗ→ㅛ→ㅘ→ㅚ→ㅙ→ㅗ (repeated circularly)

Number key 2: ㅡ→ㅢ→ㅡ (repeated circularly)

Number key 3: ㅜ→ㅠ→ㅝ→ㅟ→ㅞ→ㅜ (repeated circularly)

Number key 4: ㅏ→ㅑ→ㅐ→ㅒ→ㅏ (repeated circularly)

Number key 5: ㅣ→ㅢ→ㅣ (repeated circularly)

Number key 6: ㅓ→ㅕ→ㅖ→ㅖ→ㅓ (repeated circularly)

Second Modified Example of Hangeul Input Method

In a Hangeul input method according to the second modified example embodiment of the present invention, a selected Hangeul jamo may be displayed on a screen of an input window 1 and input candidate group display window 2 shown in FIGS. 4A and 4B, as in the first embodiment described above.

Particularly, in the second embodiment, an extended consonant or combined vowel is selected by repeatedly operating a consonant key or vowel key in addition to a basic consonant and basic vowel, and therefore the necessity for the input candidate group display window 2 for displaying an input candidate group according to selection of a consonant key or vowel key increases.

In the second modified embodiment, a selected Hangeul jamo is displayed on the input window 1 as described in the first modified example; on the input candidate group display window 2, instead of display according to selection of a shift key in the first modified embodiment, when a consonant key is selected, basic consonants assigned to each consonant key and extended consonants converted from the basic consonants are displayed in the sequence of an aspirate and fortis; when a vowel key is selected, basic vowels assigned to each vowel key are displayed and the basic vowels and consonant vowels following the basic vowels in the writing sequence are sequentially displayed.

Figure 5:
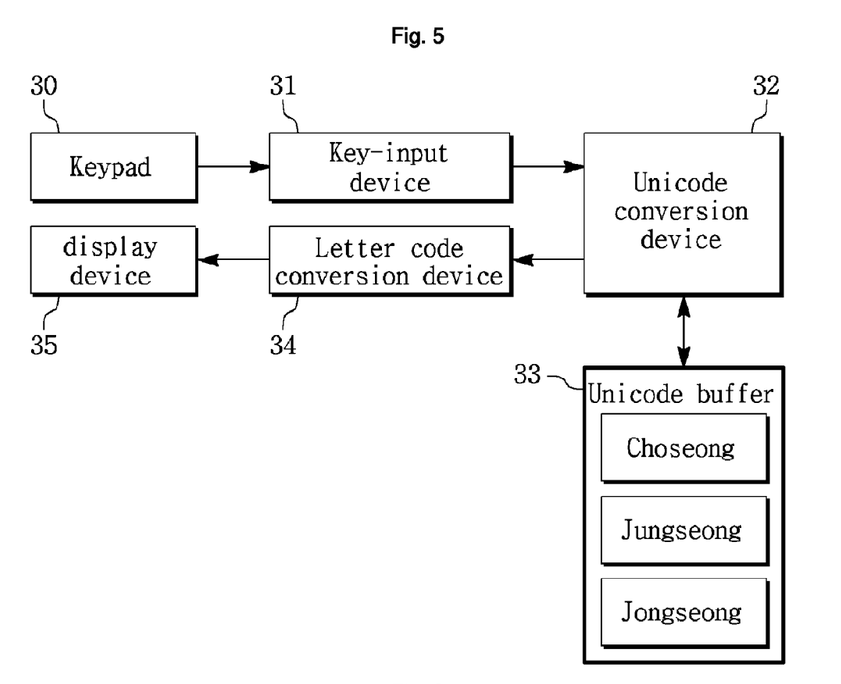
FIG. 5 shows the content of a screen display of a display device in the second modified example embodiment of the Hangeul input method according to the present invention.
Figure 6:
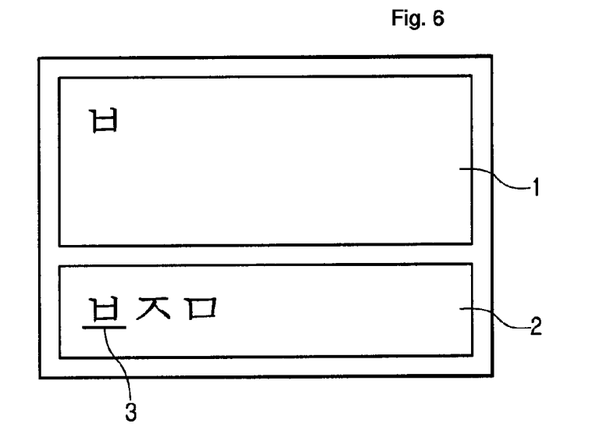
Figure 7:
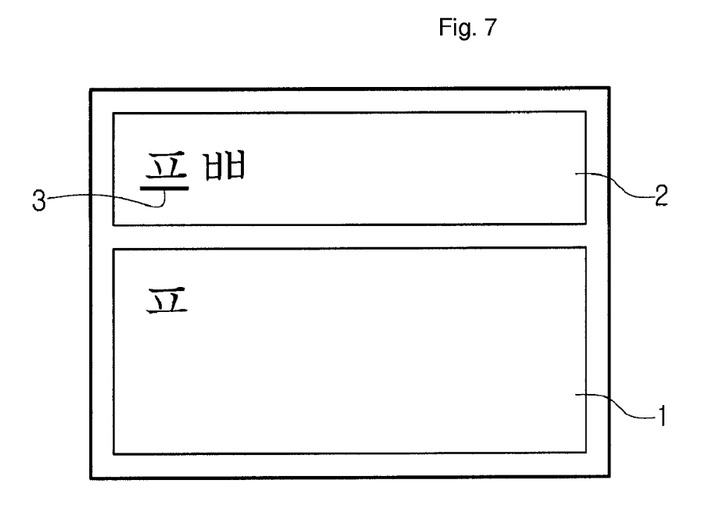
Figure 8:
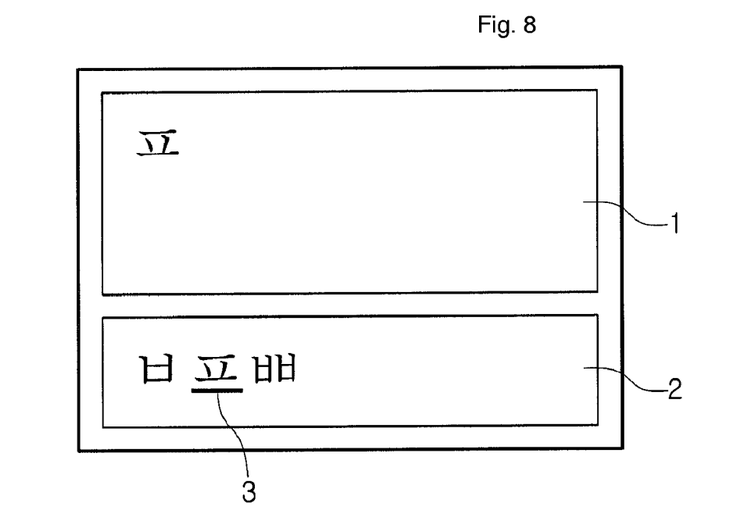
Figure 9:
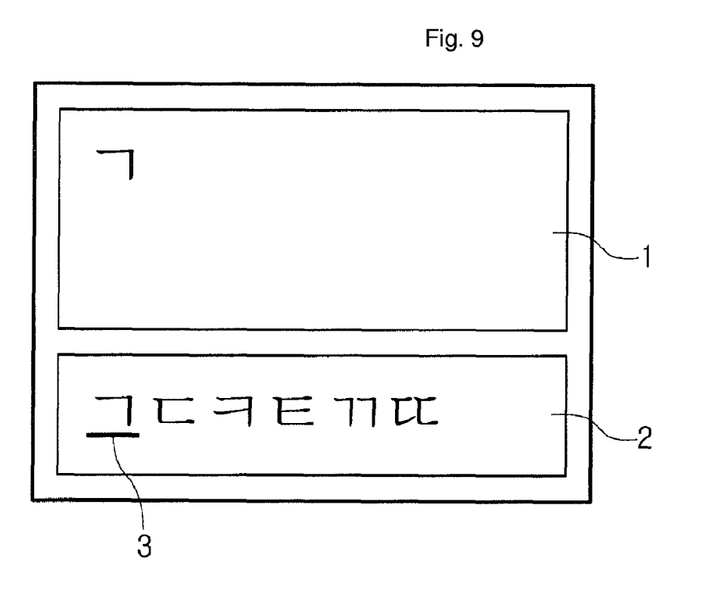

For example, when the number key 7 of the Hangeul input keypad shown in FIG. 2A is selected, in addition to basic consonants of ㄱ and ㄷ assigned to the number key 7, extended consonants of ㅋ, ㅌ, ㄲ and ㄸ converted from the ㄱ and ㄷ are displayed on the input candidate group display window 3 in the sequence of an aspirate and fortis. At this time, the ㄱ, which is the first among the consonants displayed on the input candidate group display window 2, is displayed on the input window 1, and a selection indicator 3 is placed under the ㄱ on the input candidate group display window 2. FIG. 5 shows the content of a screen display of a display device when the number key 7 is operated once.

Table 4 shows display states on the input candidate group display window 2 according to selection of consonant keys and vowel keys when Hangeul is input according to the second modified embodiment described above, using the Hangeul input keypad shown in FIG. 2A.

TABLE 4

| Hangeul jamo assigned to the selected keys | Display states on input candidate group display window |
|---|---|
| ㄱㄷ | ㄱㄷㅋㅌㄲㄸ |
| ㅇㅅ | ㅇㅅㅎㅆ |
| ㄴㄹ | ㄴㄹ |
| ㅂㅈㅁ | ㅂㅈㅁㅍㅊㅃㅉ |
| ㅏㅑ | ㅏㅑㅒ |
| ㅓㅕ | ㅓㅕㅖ |
| ㅗㅛ | ㅗㅛㅘㅙ |
| ㅜㅠ | ㅜㅠㅝㅞ |
| ㅡ | ㅡㅢ |
| ㅣ | ㅣ |

As described above, Hangeul input and output procedures in the second embodiment and second modified embodiment are the same as those in the first embodiment described above, and are carried out by the same procedure as that of Hangeul input and output shown in FIG. 3. Unicode values of Hangeul choseong, jungseong and jongseong in the first embodiment shown in Table 2 are also used in the second embodiment, but input key values of extended consonants and combined vowels are different.

That is, in the case of ㅋ in Table 2, the ㅋ corresponds to a key input value formed by adding a key input value of a shift key * to a basic consonant key input value of ㄱ (7) as an additional input, and in the second embodiment, the ㅋ corresponds to a key input value of ㅋ (777) formed by adding a basic consonant key input value of ㄱ (7) three times. Table 5 shows key input values of extended consonants and combined vowels in the second embodiment as follows.

TABLE 5

| Key input values | |
|---|---|
| Extended consonants | Combined vowels |
| ㅋ (777) | ㅘ (111) |
| ㅌ (7777) | ㅙ (1111) |
| ㄲ (77777) | ㅒ (11111) |
| ㄸ (777777) | ㅢ (22 or 55) |
| ㅎ (888) | ㅝ (333) |
| ㅆ (8888) | ㅟ (3333) |
| ㅍ (0000) | ㅞ (33333) |
| ㅊ (00000) | ㅐ (444) |
| ㅃ (000000) | ㅒ (4444) |
| ㅉ (0000000) | ㅖ (666) |
| | ㅖ (6666) |

Third Example Embodiment of Hangeul Input Method

In the Hangeul input method according to the third embodiment, basically the input method of basic consonants and basic vowels is the same as that of the first embodiment, and input of extended consonants and combined vowels may be carried out by the method described in the first embodiment or by the method described in the second embodiment.

For example, in the Hangeul input method according to the third embodiment, ㅍ may be input by selecting a shift key after selecting ㅂ by operating the number key 0 of a Hangeul input keypad shown in FIG. 2A, or the ㅍ may be input by repeatedly selecting four times the number key 0 of the Hangeul input keypad shown in FIG. 2A.

In the same manner, in the Hangeul input method according to the third embodiment, ㅝ may be input by finally selecting the number key 6 after ㅜ is selected by operating the number key 3 of the Hangeul input keypad shown in FIG. 2A, or the ㅝ may be input by operating three times the number key 3 of the Hangeul input keypad shown in FIG. 2A.

The invention claimed is:

1. A Hangeul input keypad comprising:
a plurality of consonant keys to which at least two basic consonants selected from the group consisting of ㄱ, ㄴ, ㄷ, ㄹ, ㅁ, ㅂ, ㅅ, ㅇ and ㅈ are assigned;
a plurality of vowel keys to which at least one basic vowel selected from the group consisting of ㅏ, ㅑ, ㅓ, ㅕ, ㅗ, ㅛ, ㅜ, ㅠ, ㅡ and ㅣ is assigned; and
a shift key for converting the basic consonants to extended consonants selected from the group consisting of ㅋ, ㅌ, ㅍ, ㅎ, ㅊ, ㄲ, ㄸ, ㅃ, ㅆ and ㅉ,
wherein the basic consonants convertible to the extended consonants by the shift key (hereinafter "basic convertible consonants"), which are ㄱ, ㄷ, ㅂ, ㅅ, ㅇ and ㅈ, are assigned to consonant keys (hereinafter "basic convertible consonants keys") located adjacent to the shift key,
all of the consonant keys are disposed adjacent to each other and all of the vowel keys are disposed adjacent to each other such that a consonant key group including all of the consonant keys is separated from a vowel key group including all of the vowel keys on a keypad, the number of the consonant keys is less than that of the vowel keys, and
the shift key is surrounded by the basic convertible consonant keys, and
the shift key is not used for converting the basic vowels.

2. The Hangeul input keypad of claim 1, further including a function key of carriage return.

3. The Hangeul input keypad of claim 1, including 4 or 5 consonant keys.

4. The Hangeul input keypad of claim 1, including 6 vowel keys.

5. The Hangeul input keypad of claim 3, wherein each of the groups (ㄱ, ㄷ), (ㅅ, ㅇ), (ㅂ, ㅈ, ㅁ), and (ㄴ, ㄹ) is assigned to a different one of the 4 consonant keys.

6. The Hangeul input keypad of claim 3, wherein each of the groups (ㄱ, ㄷ), (ㅅ, ㅇ), (ㅂ, ㅈ), (ㅁ, ㄹ), and (ㄴ) is assigned to a different one of the 5 consonant keys.

7. The Hangeul input keypad of claim 4, wherein each of the groups (ㅗ, ㅛ), (ㅏ, ㅑ), (ㅡ), (ㅣ), (ㅜ, ㅠ), and (ㅓ, ㅕ) is assigned to a different one of the 6 vowel keys.

8. The Hangeul input keypad of claim 5, wherein the shift key is disposed at a position adjacent to the basic convertible consonant key to which ㄱ and ㄷ are assigned, the basic convertible consonant key to which ㅇ and ㅅ are assigned, and the basic convertible consonant key to which ㅂ, ㅈ and ㅁ are assigned.

9. The Hangeul input keypad of claim 6, wherein the shift key is disposed at a position adjacent to the basic convertible consonant key to which ㄱ and ㄴ are assigned, the basic convertible consonant key to which ㅇ and ㅅ are assigned, and the basic convertible consonant key to which ㅂ and ㅈ are assigned.

10. The Hangeul input keypad of claim 1, wherein the Hangeul input keypad is displayed on a screen of a display device.

11. A Hangeul input method using the keypad of claim 1, wherein: input of a basic consonant is performed by selecting a consonant key to which the basic consonant to be input is assigned, and selecting the basic consonant to be input by operating the selected consonant key;
  input of an extended consonant is performed by selecting a basic convertible consonant key to which the basic convertible consonant corresponding to the extended consonant to be input is assigned, selecting the corresponding basic convertible consonant by operating the selected basic convertible consonant key, and operating a shift key;
  input of a basic vowel is performed by selecting a vowel key to which the basic vowel to be input is assigned, and selecting the basic vowel to be input by operating the selected vowel key; and
  input of a combined vowel formed by combining more than two basic vowels is performed by selecting and operating vowel keys, in the writing sequence of the combined vowel in Hangeul, to which the basic vowels forming the combined vowels are assigned.

12. The Hangeul input method of claim 11, wherein the basic consonants assigned to the selected consonant key are sequentially and circularly selected by repeatedly operating the selected consonant key, the basic vowels assigned to the selected vowel key are sequentially and circularly selected by repeatedly operating the selected consonant key, and the extended consonants to be converted from the corresponding basic convertible consonants are sequentially and circularly selected by repeatedly operating the shift key.

13. The Hangeul input method of claim 12, wherein the extended consonants are circularly selected in the sequence of an aspirate of the corresponding basic convertible consonant and fortis of the corresponding basic convertible consonant by repeatedly operating the shift key.

14. The Hangeul input method of claim 12, wherein the extended consonants are sequentially and circularly selected in the sequence of an aspirate of the corresponding basic convertible consonants, a fortis of the corresponding basic convertible consonants and the corresponding basic convertible consonants by repeatedly operating the shift key.

15. The Hangeul input method of claim 12, wherein the selected basic consonant, extended consonant, basic vowel, and combined vowel are displayed on a display screen, the display screen including:
  an input window for displaying the selected basic consonant, extended consonant, basic vowel, and combined vowel; and
  an input candidate group display window for sequentially displaying the basic consonants and basic vowels assigned respectively to the consonant keys and vowel keys when selecting the consonant keys and vowel keys, and displaying the extended consonants converted from the corresponding basic convertible consonants by the shift key in the sequence of an aspirate of the corresponding basic convertible consonants and a fortis of the corresponding basic convertible consonants when selecting the shift key.

16. The Hangeul input method of claim 15, wherein the corresponding basic consonant is also displayed on the input candidate group display window in the sequence of the corresponding basic consonants, aspirate of the corresponding basic consonants, and fortis of the corresponding basic consonants when selecting the conversion key.

17. A Hangeul input method using the keypad of claim 1, wherein:
  input of a basic consonant is performed by selecting a consonant key to which the basic consonant to be input is assigned, and selecting the basic consonant to be input by operating the selected consonant key;
  input of an extended consonant is performed by selecting a basic convertible consonant key to which the basic convertible consonant corresponding to the extended consonant to be input is assigned, and selecting the extended consonant to be input by repeatedly operating the selected basic convertible consonant key;
  input of a basic vowel is performed by selecting a vowel key to which the basic vowel to be input is assigned, and selecting the basic vowel to be input by operating the selected vowel key; and
  input of a combined vowel formed by combining more than two basic vowels is performed by selecting a vowel key to which a first basic vowel (the preceding basic vowel of the basic vowels forming a combined vowel in the writing sequence of the combined vowel in Hangeul) to be input is assigned, and selecting the combined vowel to be input by repeatedly operating the selected vowel key.

18. The Hangeul input method of claim 17, wherein input of ㅢ among the combined vowels is performed by selecting a vowel key to which ㅣ is assigned, and repeatedly operating the selected vowel key to which the ㅣ is assigned.

19. The Hangeul input method of claim 17, wherein, when selecting a consonant key among a plurality of consonant keys in the input of the basic consonants and the extended consonants, the basic consonants assigned to the selected consonant key and the extended consonants converted from the basic convertible consonants assigned to the selected basic convertible consonant key are sequentially and circularly selected by repeatedly operating the selected basic convertible consonant key; and
  when selecting a vowel key among a plurality of vowel keys in the input of the basic vowels and the combined vowels, the basic vowels assigned to the selected vowel key and the combined vowels having the basic vowels assigned to the selected key as the first basic vowel are sequentially and circularly selected by repeatedly operating the selected vowel key.

20. The Hangeul input method of claim 19, wherein, in the input of the basic consonants and the extended consonants, circular selection according to the repeated selection of the selected consonant key is performed in the sequence of the basic consonants, aspirates of the basic consonants, and fortises of the basic consonants assigned to the selected consonant key.

21. The Hangeul input method of claim 17, wherein, when selecting a consonant key among a plurality of consonant keys in the input of the basic consonants and the extended consonants, the basic consonants assigned to the selected consonant key and the extended consonants corresponding to the assigned basic convertible consonants are displayed on an input candidate group display window of the display screen in the sequence of the assigned basic consonants and the extended consonants corresponding to the assigned basic convertible consonants, and the assigned basic consonants and extended consonants corresponding to the assigned basic convertible consonants displayed on the input candidate group display window are sequentially and circularly selected and displayed on an input window of the display screen by repeatedly operating the selected consonant key; and when selecting a vowel key among a plurality of vowel keys in the input of the basic and the combined vowels, the basic vowels assigned to the selected vowel key and the combined vowel having the assigned basic vowels as the first basic vowel are displayed on the input candidate group display window of the display screen in the sequence of the assigned basic vowels and the combined vowels having the assigned basic vowels as the first basic vowel, and the assigned basic vowels and the combined vowels having the assigned basic vowels as the first basic vowel displayed on the input candidate group display window are sequentially and circularly selected and displayed on the input window of the display screen by repeatedly operating the selected vowel key.

22. The Hangeul input method of claim 21, wherein, when selecting a vowel key to which the ㅣ is assigned, the ㅣ and ㅢ are sequentially displayed on the input candidate group display window of the display screen, and the ㅣ and ㅢ are sequentially and circularly selected by repeatedly operating the selected vowel key to which the ㅣ is assigned.

23. The Hangeul input method of claim 11, wherein the input of the extended consonant is performed by selecting a basic convertible consonant key to which the basic convertible consonant corresponding to the extended consonant to be input is assigned, selecting the corresponding basic convertible consonant by operating the selected basic convertible consonant key, and operating a shift key, or by selecting a basic convertible consonant key to which a basic convertible consonant corresponding to the extended consonant to be input is assigned, and selecting the extended consonant to be input by repeatedly operating the selected basic convertible consonant key; and the input of the combined vowel is performed by selecting and operating a vowel key, in the writing sequence of the combined vowels in Hangeul, to which the basic vowels forming the combined vowels are assigned, or by selecting a vowel key to which a first basic vowel (the preceding basic vowel of the basic vowels forming combined vowels in the writing sequence of combined vowels in Hangeul) to be input is assigned, and selecting the combined vowel to be input by repeatedly operating the selected vowel key.

24. The Hangeul input key pad of claim 1, wherein the consonant key group is located closer to the shift key than the vowel key group.

* * * * *